United States Patent [19]

Inova et al.

[11] Patent Number: 5,136,390
[45] Date of Patent: Aug. 4, 1992

[54] ADJUSTABLE MULTIPLE IMAGE DISPLAY SMOOTHING METHOD AND APPARATUS

[75] Inventors: Peter J. Inova, Glendale; Leonardo Del Castillo, San Dimas; Gary E. Thompson, Los Angeles, all of Calif.

[73] Assignee: Metavision Corporation, Burbank, Calif.

[21] Appl. No.: 609,397

[22] Filed: Nov. 5, 1990

[51] Int. Cl.[5] .............................. H04N 5/74
[52] U.S. Cl. .................... 358/231; 358/87; 358/60
[58] Field of Search ............ 358/87, 231, 60, 139, 358/168

[56] References Cited

U.S. PATENT DOCUMENTS

| | | | |
|---|---|---|---|
| 4,739,396 | 4/1988 | Hyatt | 358/231 |
| 4,797,942 | 1/1989 | Burt | 358/87 X |
| 4,999,703 | 3/1991 | Henderson | 358/60 |

Primary Examiner—Victor R. Kostak
Attorney, Agent, or Firm—Christie, Parker & Hale

OTHER DOCUMENTS

Lyon, Paul "Edge-Blending Multiple Projection Displays On A Dome Surface To Form Continuous Wide Angle Fields-of-View," pp. 203–207, *Proceedings, November 19-21, 1985, 7th Interservice Industry Training Equipment Conference.*

[57] ABSTRACT

A method and apparatus for establishing consistent image brightness, especially for a multiple video image seamless display, is provided by storing a set of smoothing factors, one for each detail element of each image, in a memory. Upon projection, the smoothing factors are applied to the brightness components of the associated detail elements of each image. The smoothing factors are selected by applying a standard curve, coarse tuning major curve parameters in response to the appearance of the projected multiple image display, and fine tuning smoothing factors for specific detail elements, the locations of the detail elements being indicated by a cursor on the display.

55 Claims, 6 Drawing Sheets

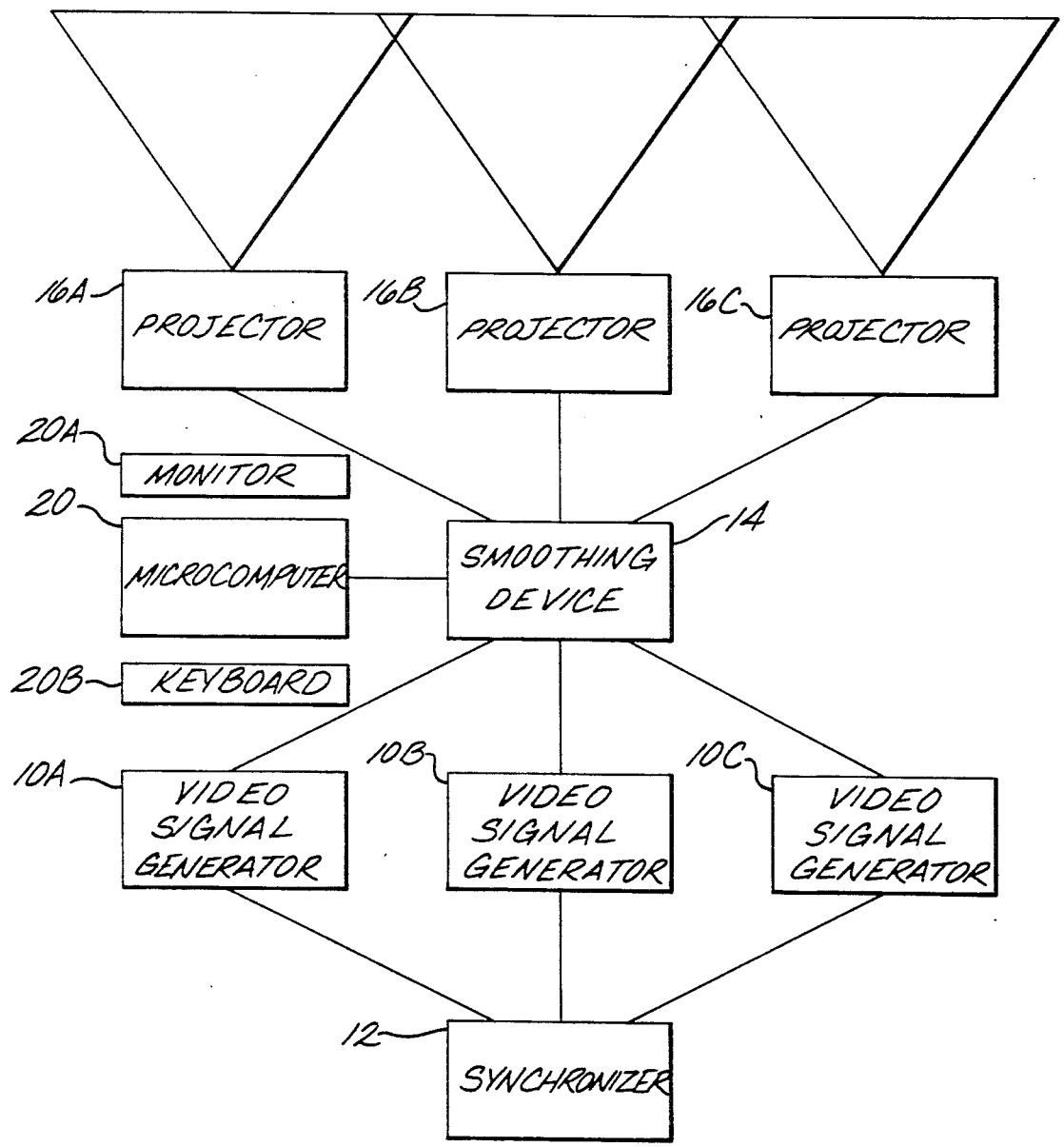

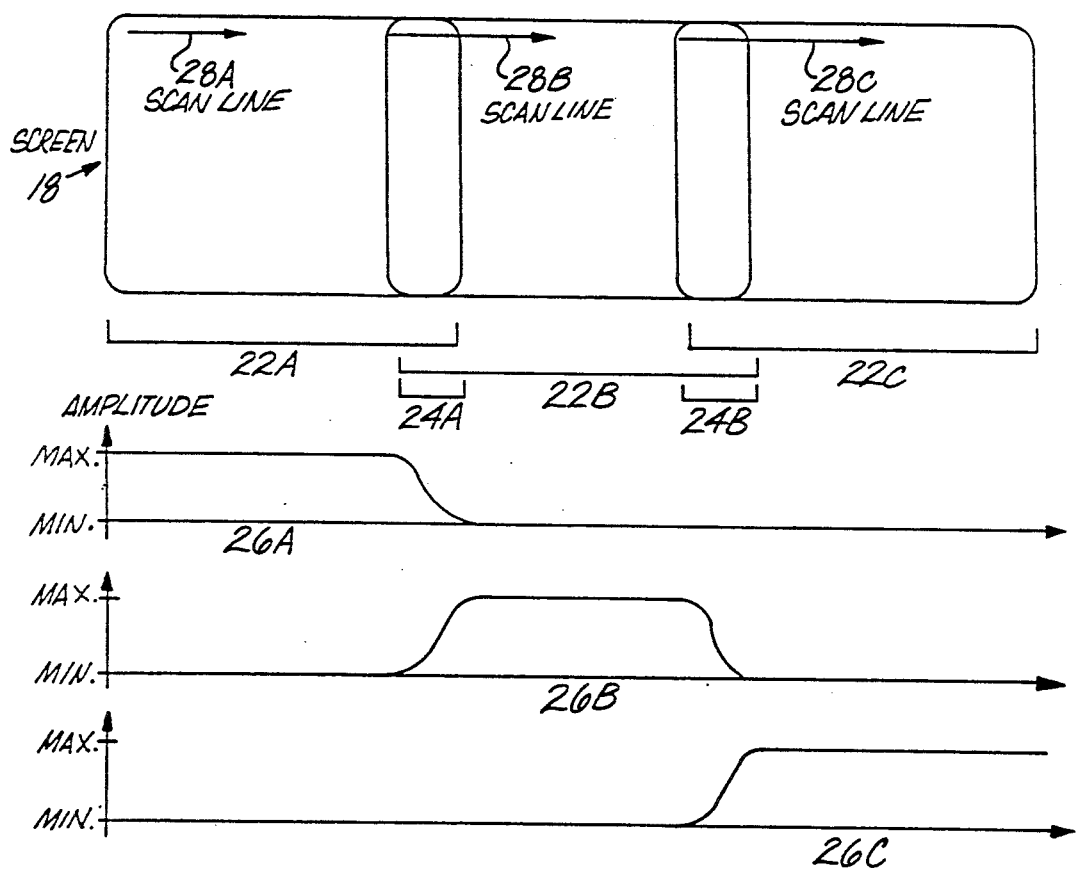

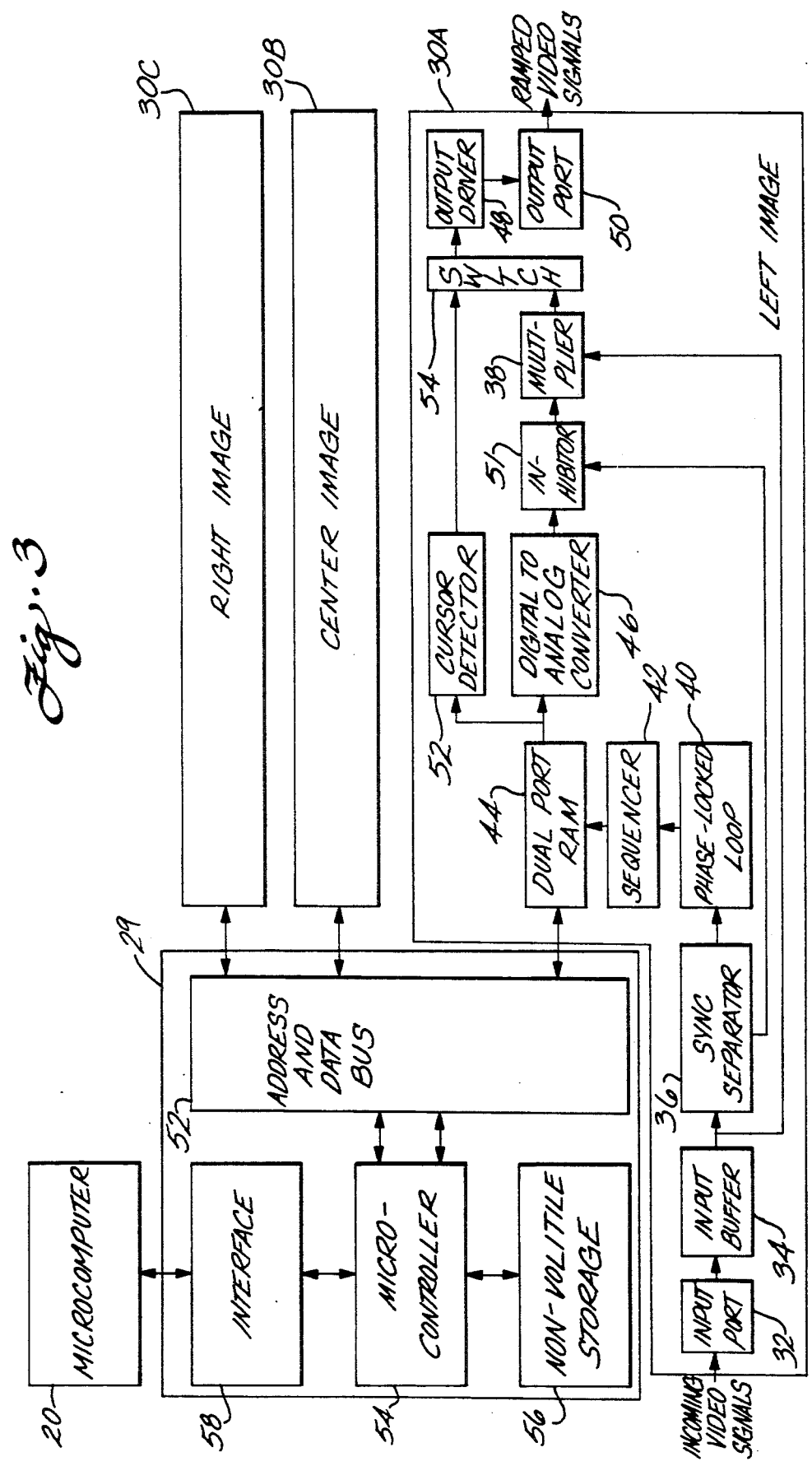

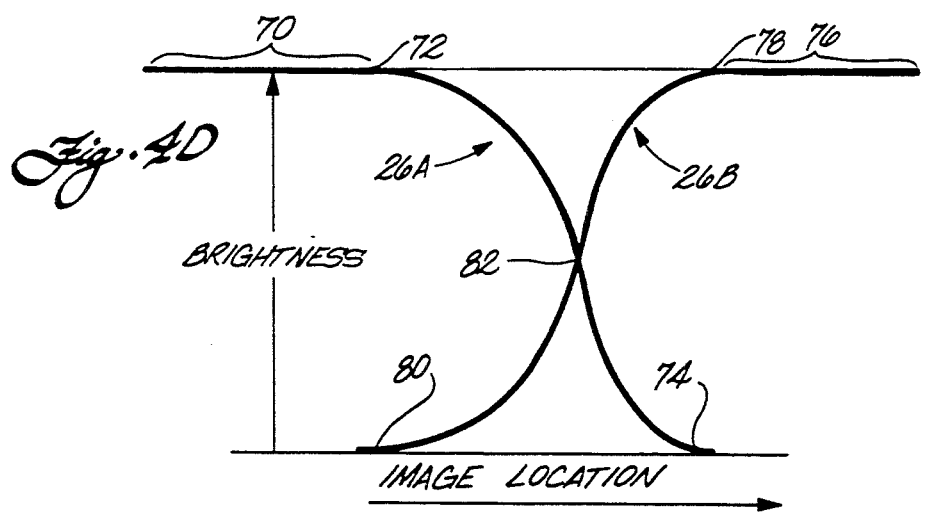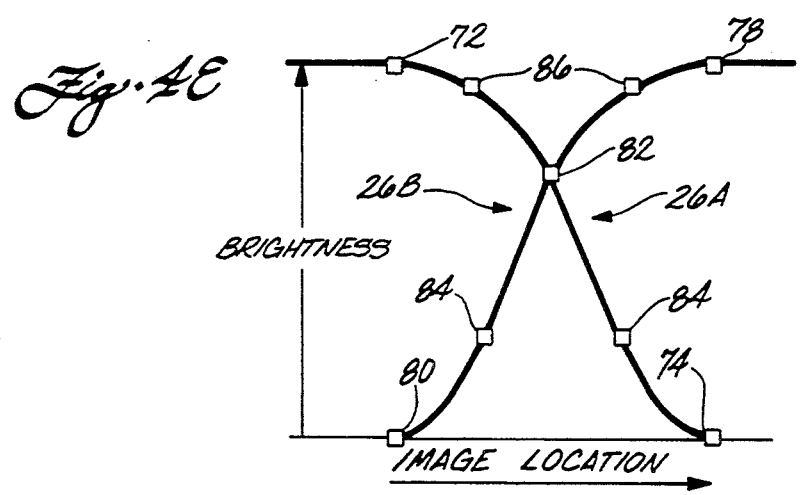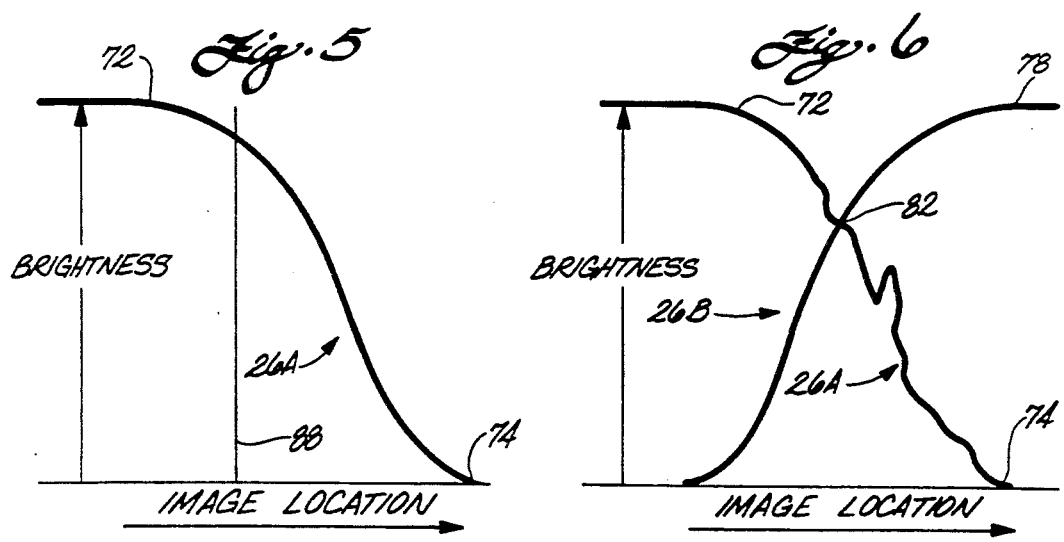

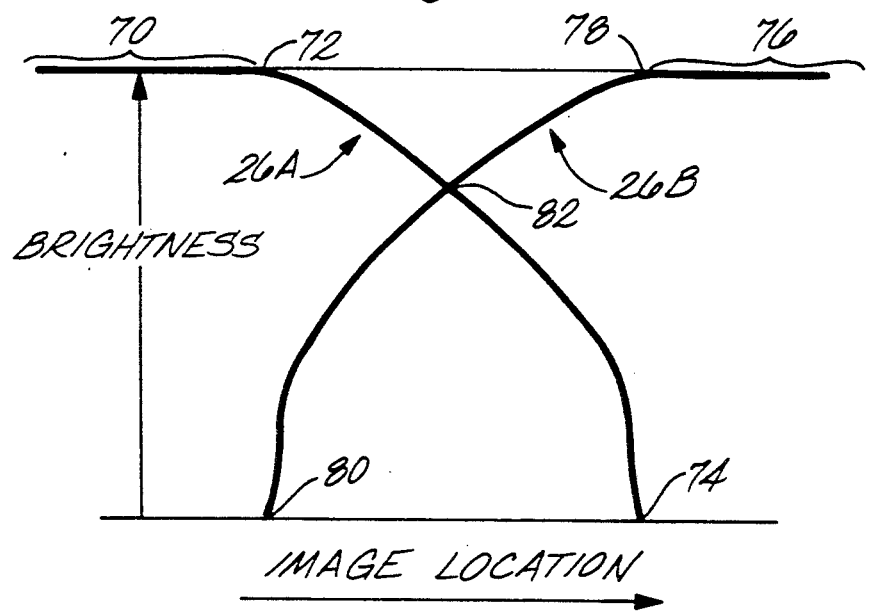

ADJUSTABLE MULTIPLE IMAGE DISPLAY SMOOTHING METHOD AND APPARATUS

FIELD OF THE INVENTION

The present invention pertains to the field of smoothing devices for video images and, in particular, to a smoothing device which applies a smoothing function to the brightness of video images and allows the function to be tailored to the specific requirements of a particular production process and projection system. It is of particular value for displays in which several video images overlap.

BACKGROUND OF THE INVENTION

U.S. patent application Ser. No. 143,870, filed Jan. 14, 1988, describes a method and apparatus for projecting a seamless display produced from multiple video projectors all focused on a single screen. The image from each projector is projected so that it overlaps a portion of the image from another projector. In order to eliminate the bright bands or seams which result in the areas where two images overlap, the brightness of the overlapping portions of the images is ramped. This is done using commercially available special effects generators. While, in theory, the uniform, even ramping function of a typical special effects generator, when applied to the edges of each image, would result in a smooth transition from one image to another, in practice, the brightness of the projected images is not smooth nor consistent. The image from a video projector becomes darker toward the edges of the image as a natural function of the lens system used, and has a number of bright and dark portions caused by normal irregularities in the signal, intermediate signal processors, the projector, the projector's phosphors, screen reflectance, and many other factors. These inconsistencies will vary from one video component to another, and even among different components with identical constructions. In addition, different types of projectors respond differently to the same amount of brightness modification. As a result, the apparent image produced by smoothly ramping the brightness of overlapping images usually has several light and dark bands and spots. Accordingly, there is a need for a smoothing device which allows a user to precisely adjust the smoothing curve with which video brightness signals are ramped throughout the overlapping region and in neighboring areas as well. Such a smoothing device should be able to compensate for anomalies in individual projection systems and for differences between projection system sensitivity.

SUMMARY OF THE INVENTION

The present invention allows the brightness of an image to be precisely adjusted from detail element to detail element across an entire video image. Coarse adjustments can be made to parameters of the brightness ramping curve, while fine adjustments can be made for specific detail elements to correct artifacts generated by the video components.

In one embodiment, the invention encompasses a method for smoothing the brightness of two adjoining overlapping video images produced from two discrete video signals which each have a plurality of detail elements each with a brightness component. The method comprises applying a predetermined set of smoothing factors to the brightness components of the detail elements of the two signals, projecting the images as modified by the smoothing factors onto a display, modifying selected smoothing factors in response to the appearance of the projected display, and, finally, storing a representation of the smoothing factor modifications.

The invention allows a seamless multiple video image display to appear more consistent and uniform in brightness than a conventional single video image display. As a result, it is useful not only for displays with multiple overlapping video images, but also for smoothing the brightness of a single video image.

BRIEF DESCRIPTION OF THE DRAWINGS

These and other aspects of the invention will be more fully understood by referring to the following detailed description and the accompanying drawings wherein:

FIG. 1 is a block diagram of a projection system incorporating the present invention;

FIG. 2 is a diagram of a screen illustrating the spatial relationship of individual smoothing curves to the projected image on the screen for use in the present invention;

FIG. 3 is a block diagram of a smoothing device according to the present invention;

FIG. 4D is a graphical illustration of the smoothing curves of FIG. 4A in which the slope of the right side curve is increased;

FIG. 4E is a graphical illustration of the smoothing curves of FIG. 4A indicating the position of preferred adjustable curve parameters;

FIG. 5 is a graphical illustration of a smoothing curve for the edge of one video image with a cursor superimposed for indicating the location of a detail element;

FIG. 6 is a graphical illustration of two smoothing curves for the overlapping portions of two images after a fine-tuning process; and FIG. 7 is a graphical illustration of two alternate smoothing curves as a function of brightness amplitude vs. image location.

DETAILED DESCRIPTION OF THE INVENTION

Figure 4A:
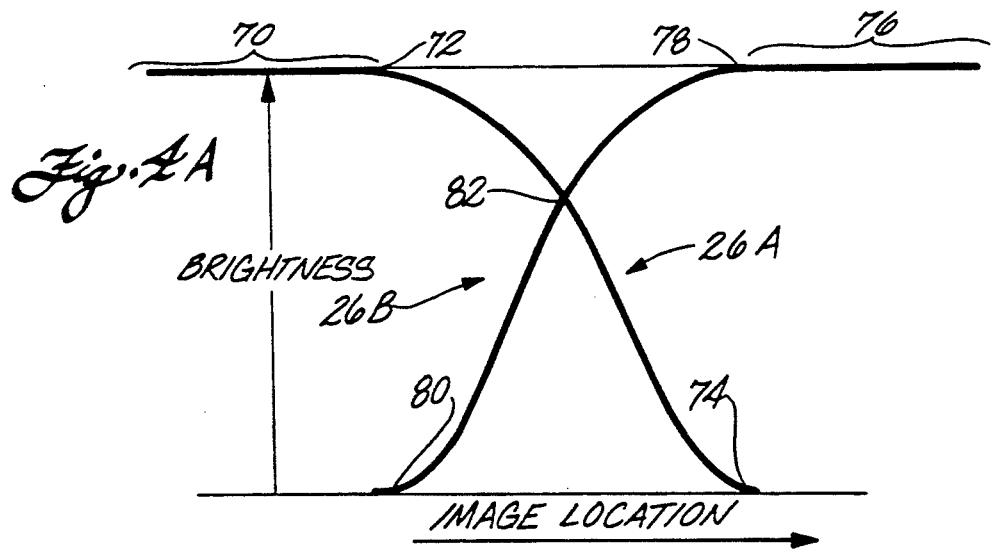
FIG. 4A is a graphical representation of two smoothing curves for the overlapping portions of two discrete video images as a function of brightness amplitude versus image location.

A typical multiple image seamless video screen projection system combines two or more discrete video signals and projects them all onto a single screen. Any number of video images may be combined horizontally, vertically, or in diagonal directions to create an image with the desired proportions. A typical format is to combine three images side-by-side to obtain a standard height image with more than twice the standard width. Such a system uses three video signal generators 10A, 10B, 10C regulated by a synchronizer 12 (see FIG. 1). The signal generator may be a camera, a receiver or some kind of playback device, for example, a videotape, a laser disk player or a computer. The generated video signals are all fed to a smoothing device or ramp generator 14 which ramps the brightness of the signals and sends them further to three discrete video projectors 16A, 16B, 16C. The projectors project the images corresponding to the ramped video signals onto a single screen 18 for display. The projectors may be electron guns which project images onto a phosphorous screen, cathode ray tube or liquid crystal regulated projectors which cast light on a reflective or transparent screen or any other type of video projector and screen system. The video signal generators, the synchronizer, the projectors, and the screen for a typical multiple-image seamless video display can all be standard off-the-shelf components commonly available on the market. For optimum resolution and durability, it is currently preferred that the signal generators be laser disk players, and that a scan doubler for each projector be used to enhance the resolution of the images projected onto the screen. A ramp generator can be provided by special effects generators, also commonly available on the market. However, in the present invention, it is preferred that a specially dedicated, tunable ramp generator controlled by a microcomputer 20 be used. The microcomputer includes a monitor 20A and a keyboard 20B. The keyboard allows the user to provide instructions to the microcomputer and can include or be replaced by a mouse, trackball, pen or other input device. A multiple image video projection system using special effects generators is described in U.S. patent application Ser. No. 07/143,870, filed Jan. 14, 1986, and assigned to the assignee of the present invention, the disclosure of which is incorporated herein fully by reference.

An alternative arrangement is to apply the smoothing curves to the video signal when a video show is under production, and then to store the ramped signals on a video laser disk or tape. The projection system then does not require a smoothing device during projection as the signals are already ramped. A second alternative is to transmit the signals from the smoothing device to a transmitter. The signals are then received in a remote location at which there is no smoothing device and projected directly onto a screen.

The apparent displayed image produced as shown in FIG. 1 is made up of three discrete video images 22A, 22B, 22C, each individually synchronously projected on the screen 18 (see FIG. 2). This allows an image almost three times the size of a conventional image with nearly three times the resolution of a single image. To smooth the transitions between the three images, the images have overlaps 24A, 24B. Because the same image is projected onto the same portion of the screen twice, these overlapping areas or seams appear significantly brighter than the neighboring regions of the apparent image. An important function of the smoothing device is to counteract this effect by ramping the brightness of the image in the seams. To do this, a ramping function or smoothing curve 26A, 26B, 26C (shown in FIG. 2 as a function of brightness amplitude versus screen or image location) is applied to each video signal before it is received by the corresponding projector. A typical NTSC video signal is made up of a series of scan lines 28A, 28B, 28C which trace an image horizontally across the screen. Hundreds of scan lines are traced one below the other until the bottom of the screen is reached and the entire video image is traced out. In a typical three image seamless display, the smoothing curves are simply applied to the brightness component signal of each scan line to achieve a relatively uniform, horizontal reduction in brightness in the overlapping portions of the images. The smoothing curves of FIG. 2 are illustrated beneath the portion of the scan line which they would affect.

Referring to FIG. 3, a preferred embodiment of a tunable smoothing device 14 particularly suited to a three-image-wide projection system includes a controller card 29 and three discrete brightness adjustment cards, one for each image channel, left 30A, center 30B and right 30C. Video signals from the video signal generators are received in each card by an input port 32. The input port transmits the video signal to an input buffer 34 which conditions the signal, isolates the incoming video line, and performs the necessary buffering. From the input buffer, the signal is transmitted to a sync separator 36 and a multiplier 38. The sync separator detects synchronization signals in the video signal and generates a pulse for each synchronization signal. In a standard NTSC video signal, each scan line is preceded by a horizontal synchronization signal. By detecting the horizontal synchronization signals, the sync separator can determine the beginning of each scan line. The synchronization separator can also detect vertical synchronization signals which mark the beginning of each scan line field. Typically, there are two fields per image. The synchronization separator generates a different pulse for each vertical synchronization signal. When the synchronization separator has detected a horizontal synchronization signal, it sends a pulse to a phase-locked loop 38. The phase-locked loop functions as a clock and generates 512 pulses following each horizontal synchronization signal. The video signal can be thought of as having 512 detail elements or picture elements (pixels) per scan line, so that the sync separator, together with the phase-locked loop, generate one pulse per pixel. The pulses transmitted by the phase-locked loop identify each pixel for each scan line. This pixel identification signal is sent to a sequencer 42.

The sequencer is used to access one port of a dual-port 512 by 8 bit random access memory (RAM). At the beginning of each scan line, the sequencer resets to address 0. As it receives pixel identification signals as pulses from the phase-locked loop, it sequences RAM addresses one per pulse from 0 to 511, sequentially addressing each of the 512 memory registers in the dual-port RAM. Each of the 512 registers in the dual-port RAM contains a smoothing factor. Each smoothing factor is associated with a specific pixel in the scan line. As the sequencer counts through addresses 0 through 511, it accesses the smoothing factor which is associated with each pixel horizontally across the scan line from 1 to 512 as that pixel is passing to the multiplier 40. The smoothing factors are preferably a digital number, the amplitude of which indicates a specific brightness adjustment or scaling factor which is to be applied to the pixel. The smoothing factor can be applied to attenuate or to amplify the brightness component of the corresponding pixel. It is presently preferred that each smoothing factor be 8 bits, allowing for 255 brightness levels from complete darkness to full brightness. The 256th level is a cursor signal as explained below. The 8-bit smoothing factor words are sent to a digital-to-analog converter 46 which converts the digital brightness adjustment word to an analog signal. The analog signal is then sent to the multiplier to be multiplied with the appropriate pixel. Any of the large variety of digital-to-analog converters known in the art may be used to convert the smoothing factor words to analog factors. However, it is preferred that the digital-to-analog converter incorporate some oversampling in order to smooth the transitions from one word to another in the analog signal which is transmitted to the multiplier.

After the smoothing factors have been applied in the multiplier, the adjusted video signal is further transmitted to an output driver 48 which buffers the output signal, matches impedances, and sends it to the output port 50 and on to the corresponding projector. Each brightness adjustment card can receive video signals from virtually any source and transmit them to any receiver. While it is presently preferred that the cards be used as the smoothing device in the projection arrangement shown in FIG. 1, the cards can be used during filming, production, post production, broadcasting or any other step leading to the display of video images.

The brightness adjustment card, using only a 512 by 8 bit RAM, allows very precise (255 shades) control of the brightness of each individual pixel in a scan line. Conventional digital circuitry is quick enough that all of the brightness ramping can be done in real time in the video signal's path to the projector. Brightness adjustments are not limited to image seams, but can be made to any portion of an image.

The pulse generated by the sync separator in response to each vertical synchronization signal is sent to an inhibitor 51. In an NTSC signal there is a time delay between scan lines when the vertical synchronization signal is transmitted. The inhibitor prevents smoothing factors from the digital to analog converter from being applied to the vertical synchronization signals by inhibiting the transmission of the smoothing factors to the multiplier. After the next horizontal synchronization signal is received, the inhibitor is shut off and smoothing factors pass to the multiplier for application to the video signal as described above.

The brightness adjustment card may be modified in a variety of ways to accomplish different ends. The preferred embodiment described above is particularly well suited for application to NTSC signals. If finer or coarser control of the ramp function is desired, the frequency of the phase-locked loop can be varied. It is not necessary for 512 smoothing factor words to be accessed for each scan line on the screen. Since the brightness ramping curve applied in the multiplier is an analog curve, more or fewer words can be used to generate the curve. Different size detail elements may be chosen instead. For example, in some applications, 256 or fewer words per scan line may be sufficient, while in other applications, it may be preferred to generate 1024 or more smoothing factors per scan line. The number of pulses generated by the phase locked loop per synchronization signal and the number of registers in the RAM can easily be adjusted to suit specific needs. Intermediate words can be generated for application to intermediate pixels through oversampling.

In addition, the dual-port RAM can be expanded to contain a unique set of smoothing factor words for each horizontal scan line. In that case, the sync separator and phase-locked loop would work in essentially the same way. However, the sequencer would then generate a continuous stream of addresses from the first pixel in an image to the last pixel in an image, accessing a different memory register each time. In an NTSC signal, this can easily be done by adapting the sync separator to detect vertical synchronization signals and send a reset pulse to the sequencer at the start of each image. In this way, both horizontal and vertical ramping can be accommodated.

The ramp generator can also be adapted for digital video. In such a case, the sync separator and phase-locked loop detect identification headers for digital pixel words and address the appropriate registers in the RAM. The RAM transmits smoothing factors directly to a multiplier which then multiplies the digital smoothing factor word with the digital pixel brightness component, and the composite word is then transmitted via the output port. The digital-to-analog converter is, of course, then unnecessary, although an interpolating device may be desired to generate intermediate smoothing factor words.

As explained in more detail below, it is sometimes desired to project a cursor onto the screen. Each brightness adjustment card 30A, therefore, includes a cursor detector function. Instead of using all of the possible 256 levels of brightness adjustment allowed by the 8-bit word in the dual-port RAM, only 255 are used. The 256th level is a cursor generator word. When the word 256 occurs at the output of the dual-port ram, a cursor detector 52 which listens to the RAM output detects the cursor signal word and sends a signal to a switch 54. The switch replaces the pixel with which the cursor signal word is associated with a medium white pixel. Since the same cursor generator word is addressed for every scan line, a single cursor generator word in the dual-port RAM will result in a vertical cursor line extending the entire height of the apparent image on the projected display. More cursors may be projected by storing more cursor signal words in the RAM.

By storing a smoothing factor for adjusting the brightness of each detail element in an image, the dual-port RAM allows very precise control of image brightness. The RAM also allows for the smoothing factors to be easily replaced with different smoothing factors to suit different applications. The other port of the dual-port RAM is connected to the controller card 29 via an address and data bus 56 which connects the RAM to a microcontroller 54. The microcontroller is, in turn, coupled to a nonvolatile memory 56, and through an interface 58 to the microcomputer 20.

In use, the smoothing factors are generated by the microcomputer 20. The microcomputer downloads the smoothing factors for each brightness adjustment card through the interface to the microcontroller, which then stores these factors in its nonvolatile memory. When the ramp generator is turned on, the microcontroller accesses the smoothing factor values in its nonvolatile memory and stores them in the appropriate registers of the corresponding RAM for each brightness adjustment card 30. As the system is operated, the smoothing factors stored on the RAM for each card are used to adjust the brightness of the images as they are received, as described above. However, any time during the device's use, the microcomputer can transmit a new smoothing factor, or a new set of smoothing factors, to the microcontroller which then stores the new smoothing factors in its nonvolatile storage and in the dual-port RAM for the appropriate brightness adjustment card. In this way, the microcomputer precisely controls the ramping, as well as the cursor location almost instantaneously.

The microcomputer used for computing the smoothing factors is preferably a conventional, general purpose digital microcomputer or personal computer with a keyboard, an output port, and a display monitor, although a large variety of general purpose or specially dedicated hardware can be used instead. It is preferred that all of the smoothing factors be computed by the microcomputer using software written specifically for that task. The software is described in more detail below. The microcomputer communicates the smoothing factors through a conventional serial RS232 port and through a conventional interface to the microcontroller. Presently, a Motorola 6809 microcontroller is used, although a Zilog Z180 may be preferred. The nonvolatile storage is preferably conventional EEPROM, although a battery-backed RAM or other nonvolatile storage device may also be used.

To generate the ramping curve and therefore the smoothing factors for a particular projector setup using the present invention, first, the projectors, video signal sources, tunable smoothing device, synchronizer and screen are coupled together. The projectors are aligned so that they each project a separate image onto the screen with the appropriate amount of overlap between images. The microcomputer is coupled to the smoothing device and, initially, sends a smoothing factor word of 254 to every register of the brightness adjustment cards 30. For a three-projector setup, such as that shown in FIG. 1, three sets of data are communicated to the microprocessor, and the microprocessor downloads the data into the respective card for each projector. Number 254, stored in each register, indicates that no amplitude adjustment is to be made to the brightness component of any of the detail elements of any video signal i.e. that unity gain is applied to the video signal.

Next, the raster edges are defined for each projector. Some projection systems will generate artifacts at the edges of their projected image. The effect is well known and is caused, in part, by nonlinearities in the projector and video signal components. The present invention allows the edges of the screen to be masked, in effect. By projecting a single image on the screen, the artifacts for that image can easily be seen. The microcomputer, through the keyboard, is instructed to load a zero smoothing factor into the memory for each pixel which is distorted by the artifacts or any other anomalies. In a typical 512-pixel screen, five to ten pixels on either end of the image may be cut off in this process. The zero smoothing factor is stored as a brightness adjustment factor. When it is applied to the pixel with which it corresponds, it virtually nullifies the brightness component of the video signal in that pixel, masking the defective portion of the image.

The process is made easier by the cursor generating function of the ramp generator. Through the cursor arrow keys on the microcomputer keyboard, the user moves a cursor displayed on the image into alignment with a defective portion of the image. The software moves the cursor by changing the RAM register in which the cursor generator word is stored. When the cursor indicates the defective pixel, the user instructs the microcomputer through the keyboard to generate a zero smoothing factor for that pixel. The zero smoothing factor is downloaded immediately to the corresponding brightness adjustment card so that the user can quickly determine whether the defect has been masked. If not, the cursor is moved and the brightness of the next pixel is zeroed until the defect is completely masked. The smoothing factors and cursor can also be displayed on the microcomputer monitor during this process in the format of FIG. 5 as described below.

Next, the line of symmetry for each overlap is defined. Identifying the center of each overlap region or line of symmetry defines some parameters of the smoothing curve for each overlap. This can be done in a variety of ways. It is presently preferred that the microcomputer calculate the center of each image after the raster edges have been trimmed, and instruct the ramp generator to project a cursor in the center of each image. The user then moves the cursors of adjoining screens, using the cursor arrow keys on the keyboard, toward each other until they meet. When the cursors overlap on the screen, the line of symmetry has been located. The computer is then informed that the line of symmetry has been found for the overlap area, and it then calculates a smoothing curve for the image overlap region based on the line of symmetry and its relationship to the trimmed end of each scan line.

A preferred form of a standard smoothing curve is shown in FIG. 4A. An equation for such a curve can be included in the microcomputer software to allow the curve to be generated mathematically each time, or a series of curves with different parameters can be stored in the software in a look-up table. The curve shown in FIG. 4A is preferably generated by the microcomputer using the following equation:

$$f(x) = \frac{16k - 5m}{v^2} x^2 + \frac{14m - 32k}{v^3} x^3 + \frac{16k - 8m}{v^4} x^4$$

where x is the horizontal distance across the screen or image location, f(x) is the smoothing factor word value or brightness, m is the maximum smoothing factor word value, in this case 254, v is the number of pixels in the overlap region after trimming the raster edges and k is the value of f(x) at the horizontal midpoint of the overlap region. v and k can be adjusted to suit particular applications as explained below; however, if k/m is less than about 0.3 or greater than about 0.7, the formula above creates discontinuities in the curve. The portion of the curve outside the overlap region is flat, i.e., f(x)=m.

To begin fine-tuning the smoothing curve, a standard smoothing or ramping curve is downloaded by the microcomputer into the smoothing device and into the RAM registers for each card. The smoothing curve is not applied to the previously trimmed raster edges. An image can then be projected from the ramped video signals onto the screen. At the same time, the microcomputer displays a graphical representation similar to that of FIG. 4A on its own monitor. FIG. 4A shows a portion of two smoothing curves for the intersection of two images, a left image curve 26A and a center image curve 26B. Similar to FIG. 2, FIG. 4A represents the smoothing curves as a plot of brightness or smoothing factor amplitude on the vertical axis, and screen position or image location on the horizontal axis.

The brightness of the left image is attenuated as it reaches its right boundary on the screen, and the brightness of the center image is attenuated as it reaches its left boundary or edge on the screen. The left image smoothing curve 26A has a flat portion 70 on the left side of FIG. 4A through which the projector's brightness is unaffected (unity gain). The flat section extends to a point of departure 72 at the edge of the image overlap. This point may be a point of inflection in some cases, but in the illustrated curve it is the point at which the curve departs from horizontal. From the point of departure, the smoothing factors are decreased (decreasing gain) so that the brightness of the left image is reduced until the ramping curve reaches its zero intercept 74 at the opposite end of the overlap. The right image similarly has a flat section 76 where the smoothing factors have a maximum amplitude, and the projected brightness is a maximum until a point of departure 78, which coincides with the beginning of the overlap area. The smoothing factor amplitude then decreases down to a zero intercept 80 at its extreme left end. The curves have an intersection 82 at which the smoothing factors which correspond to overlapping pixels for the left and center images have the same amplitude. Ideally, that amplitude adjusts the video signal brightness so that the two projectors will generate precisely half the brightness generated for the unity gain regions, 70, 76. It is preferred that the microcomputer software allow for the entire ramping function to be displayed in whole and in parts on its monitor in a format similar to that shown in FIGS. 4 to 7.

Figure 4B:
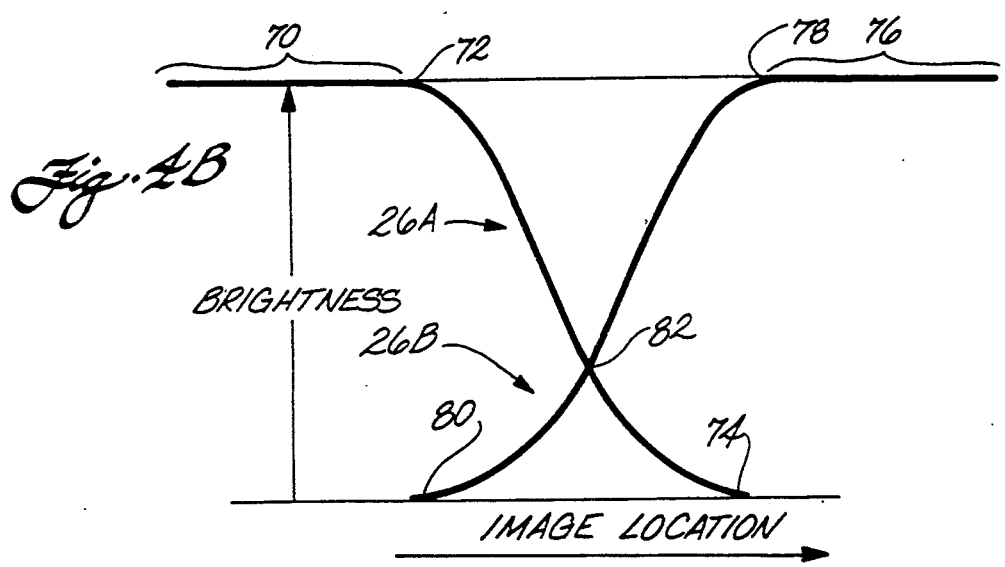
FIG. 4B is a graphical illustration of the smoothing curves of FIG. 4A in which the intersection of the curves has been translated.
Figure 4C:
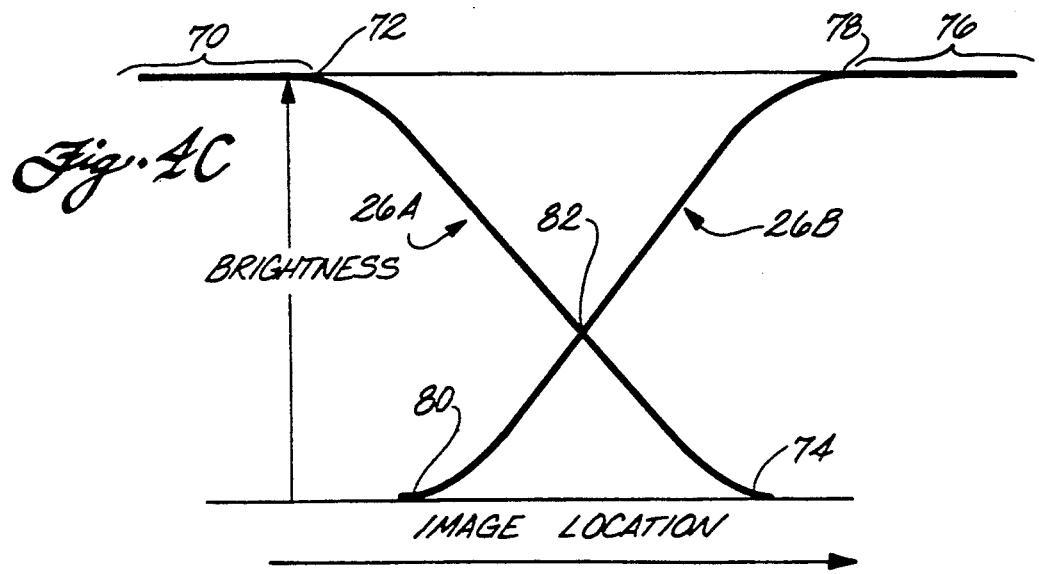
FIG. 4C is a graphical illustration of the smoothing curves of FIG. 4A in which the points of departure have been translated.

By observing the projected image when the standard curve has been applied, the user can make a number of coarse adjustments to the smoothness of the overall image. For example, the smoothing curves can be translated from side to side. If the center of each overlap or seam is brighter than its edges, the intersection 82 of the two curves can be decreased in amplitude. In FIG. 4B, the parameter k has been reduced on both curves to lower the intersection. If, on the other hand, the edges on either side of the overlap are brighter than the overlap, then the points of departure 72, 78 can be moved further apart from each other. In FIG. 4C, the parameter v has been increased on both curves to move the points of departure further apart. The curves can also be adjusted independently if it appears that the falloff characteristics for the brightness of one projector or video signal differ from that of another. If, for example, the center image projector does not respond to the smoothing factors as well as the left image projector, this can be compensated for by drawing down the smoothing factor amplitudes for the entire overlap portion of the center image 26B. In FIG. 4D the parameter k has been reduced on only the center curve 26B.

It is preferred that there be a specific set of curve parameters which can be moved both up and down in amplitude, and left and right in screen location, to adjust each curve to achieve the best smoothing effect for the particular display components involved. Examples of preferred adjustable parameters are indicated by boxes in FIG. 4E. The adjustable parameters preferably include the points of departure 72, 78, the intersection 82, the zero intercepts 74, 80, as well as a lower arm midpoint 84 and an upper arm midpoint 86. The microcomputer can be programmed so that the user may move any of these parameters up, down, left, or right using the keyboard. The slope of any of the curves is affected by moving these parameters. The computer replots the standard curve by adjusting smoothing factors so that the curve smoothly intersects the redefined curve parameters and the continuity of the curves is maintained. The replotted curve results in a new set of smoothing factors calculated by the computer and transmitted to the smoothing device. The smoothing device allows the results of the coarse adjustment to be viewed instantly on the screen. The microcomputer is preferably programmed to display a representation of the replotted curves on its monitor.

The coarse level adjustments are not limited, of course, to the overlap area. Since the ramp generator stores a smoothing factor for every pixel across the entire width of the screen, smoothing factors can be applied to other portions of the image, as well. For example, most displays which rely on optical lenses to produce an image are brighter in the center of the image than they are towards the ends of the image. In normal viewing, this is not a problem because the human eye easily accepts the diminishing brightness towards the edges of the image. However, when several images are projected side-by-side, the eye sees a gradual increase in brightness toward the centers of the three images, and a reduction in brightness towards the overlap areas. A consistent brightness all the way across the screen can be achieved by defining a curve parameter near the center of the screen and drawing this parameter down between the points of departure until the center of each image is no brighter than the overlap areas. Drawing the center curve parameter down causes the computer to replot the curves by adjusting the smoothing factors to reach a local minimum at the center of the image, gradually increasing toward the points of departure at the overlap areas and then decreasing again.

After the coarse tuning is completed, specific points along the curve can be adjusted individually. The coarse tuning process is effective to overcome smooth and gradual problems in image brightness. However, many projection systems display aberrational behavior only at specific points. As a result, specific portions of an image may be distinctly brighter or dimmer than other portions of an image. This is particularly common towards the edges of an image which coincide with the overlap regions, although the present invention allows adjustments to be made across the entire image. To fine-tune specific smoothing factors for specific detail elements, for example, pixels, or for specific groups of pixels, the microcomputer causes a cursor to be displayed on the screen. Preferably, as with coarse tuning, the microcomputer displays a representation of the smoothing curve being applied at the time and the cursor 88 on its monitor in a format similar to that shown in FIG. 5. Different portions of the smoothing curve can be viewed by moving the cursor. Cursor arrows on the microcomputer keyboard can be used to move the cursor until it indicates the pixels at a problem area for an image. The smoothing factor associated with the particular pixel indicated by the cursor can then be adjusted up or down through the keyboard to compensate for the problem. Neighboring pixels can be adjusted by moving the cursor to indicate the neighboring pixels and adjusting the smoothing factors corresponding to those pixels. This process can be continued until all visible artifacts have been effectively removed or masked. The process can be done for one particular image using one projector alone, and with all projectors operating simultaneously. Using one projector alone offers the advantage that artifacts produced by one projector in an overlap region can be isolated and corrected without affecting the overlapping image from the neighboring projector.

Coarser tuning can also be performed using the cursor and adjusting several smoothing factors together. Using the monitor, adjustments to individual smoothing factors show up not only as a change in the appearance of the apparent image on the screen, but also as a change in the curve displayed on the microcomputer monitor (see FIG. 5). After the coarse tuning and fine tuning processes are completed, the final curve may be quite different from the standard curve that was used as a starting point (see, e.g., FIG. 6).

While the curves shown in FIG. 4 are preferred for many applications, in some applications a different curve is preferred. This curve is shown roughly in FIG. 7. It is presently preferred that the microcomputer be programmed to generate both curves so that the curve selection can be made by trial and error while the curves are being applied to the projected image. The curves described herein work well in a projection arrangement such as that shown in FIG. 1. Other curves may work better for other purposes. The curve of FIG. 7 is generated by the equation:

$$f(x) = m(x/v)^{1/g}$$

where f(x), m, x and v are defined as for FIGS. 4 and g is a parameter which determines the curvature of the curve. v and g can be adjusted to coarse tune the curve. The curve is modified at its end points as x approaches zero by superimposing the modification that:

$$f(x) = \tfrac{1}{2}f(x+1) \text{ for } 0 < x < n$$

n is typically chosen to be about eight so that the smoothing factor values for the last eight pixels are adjusted downward. The effect of this adjustment is clearly shown in FIG. 7. As with the curve of FIG. 4A the portion beyond the overlap region is flat, i.e., f(x)=m.

The final tuned curves are stored in the microcontroller's nonvolatile storage and saved there for future use. They can also be stored in the microcomputer. The microcomputer can be disconnected from the ramp generator and used to calibrate other ramp generators. When the projection system is powered on, the microcontroller accesses the stored fine-tuned curves in its nonvolatile memory, downloads these into the corresponding card for each image channel, and projection can begin. With conventional cathode ray tube-based video projectors, the characteristics of the projector change over time. It is preferred that the smoothing factors be recalibrated periodically. This is easily done by reconnecting the microcomputer and making coarse and fine tuning adjustments as described above.

Although it is preferred that the smoothing factors be precisely calibrated for each individual projection arrangement, if a lower quality of smoothness is acceptable, this may not be necessary. Instead, a single set of fixed smoothing curves can be stored in the nonvolatile memory. For greater control, a standardized set of smoothing curves for different projector, video player, and screen combinations can be prepared and then stored in the controller card's nonvolatile memory. A switch can be provided on the smoothing device housing to select the smoothing curve corresponding to the projection arrangement being used. The user then simply sets the switch for his projector setup and connects the apparatus. An adequate, but not optimum, ramp function is then applied to the video signals. Alternatively, the nonvolatile memory can be provided on a single separate chip with the smoothing factors burned in or permanently stored in some other way. The ramp functions can then be replaced by replacing the memory chip.

Many video signals have separate brightness components for each color. A typical NTSC video projection system will have a unique brightness signal for red, green, and blue. A typical projector will behave differently for each color. If the smoothness across the combined apparent image screen is optimized with an image that is primarily blue or white, then when a primarily red image appears, the apparent image will no longer appear as smooth. Since in a typical projector, red, green, and blue portions of the image are generated by different parts of the projector, each color will have different artifacts and nonlinearities. The smoothing device of the present invention can also be provided with a separate brightness adjustment card for each color component of the video signal, and with minor modifications to the input buffer to demultiplex the color components of the signals. With this arrangement, nine cards of the type shown in FIG. 3 are required for a three-projector system. Each card is assigned to a specific color and a specific image. The same tuning process described above is applied for each color by projecting an image consisting primarily or exclusively of the corresponding color, and then making the smoothing factor adjustments.

The specific hardware configuration shown in FIG. 3 is not necessary to practice the present invention, but is provided only by way of example. Three, nine or more brightness adjustment cards can be combined on a single printed circuit board or in a single integrated circuit chip. The controller card can also be integrated with one or more brightness adjustment cards. The described embodiment is preferred because of its flexibility and because it uses existing components. The device 14 with one controller card can be used with one brightness adjustment card to affect a single image or with a larger number of cards to affect a larger number of images. In the claims below, the expression "detail element" is used to refer to a portion of a video image. The detail element may be a pixel or it may be any other size portion of a video image. A variety of other modifications and adaptations are possible within the scope of the present invention, and it is not intended to limit the scope of the invention to those embodiments discussed above, but only by the claims below.

What is claimed is:

1. Method for smoothing the brightness of a video image produced from a video signal comprising a plurality of pixels, each pixel having a brightness component, the method comprising:
   a) applying a predetermined set of smoothing factors to the brightness components of the individual pixels, each smoothing factor being associated with the pixel to which it is applied;
   b) projecting the image, as corrected by the smoothing factors, on a display;
   c) modifying individual smoothing factors independently of one another in response to the appearance of the projected image;
   d) storing the modified smoothing factors; and
   e) projecting a plurality of images each corrected by the stored smoothing factors onto the display to correct for projection artifacts.

2. The method of claim 1 wherein the step of modifying comprises:
   projecting a cursor indicating the image location corresponding to a specific detail element onto the display; and
   modifying the smoothing factor associated with the specific detail element.

3. The method of claim 2 wherein the step of modifying further comprises:
   moving the projected cursor to indicate the image location of a different specific detail element;

modifying the smoothing factor associated with the different specific detail element; and repeating the steps of moving the cursor and modifying the smoothing factor until a desired appearance for the projected image has been obtained.

4. The method of claim 1 comprising:

plotting a representation of at least a portion of the set of smoothing factors with a predetermined smoothness as a continuous function of smoothing function amplitude versus the location of the detail element with which the smoothing factor is associated;

displaying the representation on a monitor;

changing the amplitude of a selected smoothing factor;

changing the amplitudes of smoothing factors near the changed smoothing factor in an amount sufficient to maintain the predetermined smoothness of the displayed plot; and displaying a representation of the changed smoothing factors on the monitor.

5. Method for smoothing the brightness of a video image produced from a video signal comprising a plurality of detail elements, each element having a brightness component, the method comprising:

a) applying a predetermined set of smoothing factors to the brightness components of the video signal, each smoothing factor being associated with the detail element to which it is applied;

b) projecting the image, as modified by the smoothing factors onto a display;

c) plotting a representation of at least a portion of the set of smoothing factors as a continuous curve of smoothing factor amplitude versus the location on the image of the detail element with which the smoothing factor is associated;

d) changing a parameter of the curve;

e) replotting the curve by adjusting smoothing factor amplitudes to maintain the continuity of the curve;

f) projecting the images as modified by the smoothing factors after the adjustment onto a display; and g) displaying the representation of the continuous curve on a monitor.

6. The method of claim 5, wherein the parameters comprise a local minimum.

7. The method of claim 5 further comprising the following steps before the step of applying a smoothing factor:

projecting the image onto the display; and assigning a smoothing factor for association with distorted detail elements at the edges of the image sufficient to substantially nullify the brightness component of the detail element to which the smoothing factor is assigned.

8. The method of claim 5 wherein each detail element comprises a pixel.

9. In a video image display system wherein the video image is produced from a video signal comprising synchronization signals and having a plurality of detail elements, each detail element having a brightness component, a method for smoothing the brightness of the image comprising:

receiving the video signal;

detecting the synchronization signals of the received video signal and generating a detail element identification in response to specific detail elements;

retrieving a smoothing factor associated with each detail element for which a detail element identification is generated, each smoothing factor having a specific brightness adjustment for application to the detail element with which it is associated;

applying the retrieved smoothing factor to the detail element with which it is associated, thereby adjusting the brightness component of the associated detail element; and transmitting the resultant video signal.

10. The method of claim 9 wherein the detail elements occur serially in the video signal and wherein the step of retrieving comprises serially addressing sequential registers of a memory containing representations of smoothing factors.

11. The method of claim 9 wherein a pre-identified brightness adjustment corresponds to a cursor indication, the method comprising:

detecting the cursor indication;

generating a cursor detail element in response to a cursor indication; and imposing the cursor detail element on the detail element with which the cursor indication is associated.

12. The method of claim 9 wherein the video signal comprises a plurality of color components for each detail element, each color component having a brightness component, and wherein each smoothing factor is associated with a specific color component.

13. The method of claim 9 wherein each detail element comprises a pixel.

14. In a video image display system wherein the video image is produced from a video signal comprising synchronization signals and having a plurality of detail elements, each detail element having a brightness component, an apparatus for smoothing the brightness of the video image comprising:

an input port for receiving the video signal a detector for detecting the synchronization signals of the received video signal and generating a detail element identification signal in response to specific detail elements;

a memory having a plurality of registers, each for storing a smoothing factor, each smoothing factor being associated with a specific detail element and indicating a specific brightness adjustment to be applied to the detail element with which it is associated;

an addresser for accessing, in response to a detail element identification signal, the stored smoothing factor from the memory which is associated with the identified detail element;

a multiplexer for applying the accessed smoothing factor's specific brightness adjustment to the detail element with which it is associated; and an output port for transmitting the resulting video signal.

15. The apparatus of claim 14 wherein the detector comprises a counter for generating a predetermined number of identification signals following each synchronization signal.

16. The apparatus of claim 14 wherein the video signal comprises horizontal synchronization signals, and the detector identifies detail elements by detecting horizontal synchronization signals.

17. The apparatus of claim 14 wherein the video signal comprises vertical synchronization signals, and the detector identifies detail elements by detecting vertical synchronization signals.

18. The apparatus of claim 14 wherein the video signal detail elements are received serially, wherein the detail element identification signals are generated serially, and wherein the addresser comprises a sequencer for serially addressing sequential registers of the memory.

19. The apparatus of claim 14 wherein the memory is a random access memory.

20. The apparatus of claim 14 wherein the video signal is received in an analog format, and the smoothing factors are stored in a digital format, the multiplexer comprising
 a digital-to-analog converter for converting digital smoothing factors to an analog format brightness adjustment, and
 a multiplier for multiplying the converted brightness adjustment with the corresponding analog detail element portion of the analog video signal.

21. The apparatus of claim 14 further comprising a cursor generator responsive to a pre-identified smoothing factor brightness adjustment indication, the detector sensing the pre-identified indication, generating a cursor detail element in response thereto, and superimposing the cursor detail element on the detail element with which the smoothing factor is associated.

22. The apparatus of claim 21 wherein the cursor generator comprises a switch for receiving the video signal after the smoothing factors have been applied, and for replacing detail elements with which the pre-identified indication is associated with a generated cursor detail element.

23. The apparatus of claim 14 further comprising:
 a second input port for receiving smoothing factors from an external source; and
 a bus for writing the smoothing factors into the memory.

24. The apparatus of claim 14 wherein the video signal comprises a plurality of color components for each detail element, each color component having a brightness component, and wherein each smoothing factor is associated with a specific color component.

25. The apparatus of claim 14 comprising a second input port, detector, memory, addresser, multiplexer and output port for smoothing the brightness of a second video image.

26. The apparatus of claim 25 comprising:
 a third input port for receiving smoothing factors from an external source; and
 a bus for writing the smoothing factors into the memory.

27. Method for smoothing the brightness of two adjoining overlapping video images, the video images being produced from two discrete video signals, the signals comprising a plurality of detail elements, each element having a brightness component, the method comprising:
 a) applying a predetermined set of smoothing factors to the brightness components of the detail elements of the two video signals, each smoothing factor being associated with the detail element to which it is applied;
 b) projecting the images, as modified by the smoothing factors, onto a display;
 c) modifying individual smoothing factors independently of one another in response to the appearance of the projected display; and
 d) storing a representation of the smoothing factor modifications.

28. The method of claim 27 wherein the step of modifying comprises:
 projecting a cursor indicating the image location corresponding to a specific detail element onto the display; and
 modifying the smoothing factor associated with the specific detail element.

29. The method of claim 28 wherein the step of modifying further comprises:
 moving the projected cursor to indicate the image location of a different specific detail element;
 modifying the smoothing factor associated with the different specific detail element; and
 repeating the steps of moving the cursor and modifying the smoothing factor until a desired appearance for the projected images has been obtained.

30. The method of claim 27 comprising:
 plotting a representation of at least a portion of the set of smoothing factors with a predetermined smoothness as a continuous function of smoothing function amplitude versus the location of the detail element with which the smoothing factor is associated;
 displaying the representation on a monitor;
 changing the amplitude of a selected smoothing factor;
 changing the amplitudes of smoothing factors near the changed smoothing factor in an amount sufficient to maintain the predetermined smoothness of the displayed plot; and
 displaying a representation of the changed smoothing factors on the monitor.

31. The method of claim 27 wherein the video signal comprises a continuous analog voltage signal which varies in amplitude, and wherein the predetermined set of smoothing factors are used to generate a continuous analog voltage signal which varies in amplitude.

32. The method of claim 27 wherein the video signals comprise a plurality of color components each having a brightness component for each detail element and wherein each smoothing factor is associated with the brightness component of a specific color component.

33. The method of claim 27 wherein each detail element comprises a pixel.

34. The method of claim 27 additionally comprising the steps of:
 applying the smoothing factor modifications to the brightness components of the detail elements of the two video signals to correct projection artifacts.

35. Method for smoothing the brightness of two adjoining overlapping video images, the video images being produced from two discrete video signals, the signals comprising a plurality of detail elements, each element having a brightness component, the method comprising:
 a) applying a predetermined set of smoothing factors to the brightness components of the two video signals, each smoothing factor being associated with the detail element to which it is applied;
 b) projecting the images, as modified by the smoothing factors onto a display;
 c) plotting a representation of at least a portion of the set of smoothing factors as a continuous curve of smoothing factor amplitude versus the location on the image of the detail element with which the smoothing factor is associated;
 d) changing a parameter of the curve;
 e) replotting the curve by adjusting smoothing factor amplitudes to maintain the continuity of the curve; and f) projecting the images as modified by the smoothing factors after the adjustment onto a display.

36. The method of claim 35 further comprising displaying the representation of the continuous curve on a monitor.

37. The method of claim 35 wherein the parameters comprise a slope.

38. The method of claim 35 wherein the parameters comprise a local minimum.

39. The method of claim 35 wherein the step of plotting a representation of at least a portion of the set of smoothing factors comprises plotting a representation of the smoothing factors associated with the detail elements in the overlapping portions of the video images as two distinct continuous intersecting curves, one for each video image.

40. The method of claim 39 wherein the parameters comprise an intersection point of the two curves.

41. The method of claim 39 wherein the parameters comprise a point of departure of at least one curve.

42. The method of claim 35 further comprising the following steps before the step of applying a smoothing factor:
projecting an image onto the display; and
assigning a smoothing factor for association with distorted detail elements at the edges of the image sufficient to substantially nullify the brightness component of the detail element to which the smoothing factor is assigned.

43. The method of claim 35 wherein the video signals comprise a plurality of color components each having a brightness component for each detail element and each smoothing factor is associated with the brightness component of a specific color component.

44. The method of claim 35 wherein each detail element comprises a pixel.

45. In a multiple video image display system wherein a portion of one video image overlaps a portion of another video image, the video images being produced from video signals having a plurality of detail elements, each detail element having a brightness component, a method for smoothing the brightness of at least one video image comprising:
receiving at least one video signal;
detecting detail elements of the received video signal and generating a detail element identification in response to specific detail elements;
retrieving a smoothing factor associated with each detail element for which a detail element identification is generated, each smoothing factor having a specific brightness adjustment for application to the detail element with which it is associated;
applying the retrieved smoothing factor to the detail element with which it is associated, thereby adjusting the brightness component of the associated detail element; and
transmitting the resultant video signal.

46. The method of claim 45 wherein the video signal comprises synchronization signals, and the step of detecting detail elements comprises detecting synchronization signals.

47. The method of claim 45 wherein the detail elements occur serially in the video signal and wherein the step of retrieving comprises serially addressing sequential registers of a memory containing representations of smoothing factors.

48. The method of claim 45 wherein a pre-identified brightness adjustment corresponds to a cursor indication, the method comprising:
detecting the cursor indication;
generating a cursor detail element in response to a cursor indication; and
imposing the cursor detail element on the detail element with which the cursor indication is associated.

49. The method of claim 45 wherein the video signal comprises a plurality of color components for each detail element, each color component having a brightness component, and wherein each smoothing factor is associated with a specific color component.

50. The method of claim 45 wherein each detail element comprises a pixel.

51. Apparatus for smoothing the brightness of two overlapping video images, the images being produced from two discrete video signals, the signals comprising a plurality of detail elements, each element having a brightness component, the apparatus comprising:
an input port for receiving a video signal;
a memory for storing a predetermined set of smoothing factors, each smoothing factor being associated with a detail element;
a multiplexer for applying each smoothing factor to the detail element with which it is associated in the received video signal;
an output port for transmitting the multiplexed video signal; and
means for modifying selected smoothing factors and replacing smoothing factors stored in memory with the corresponding modified smoothing factors.

52. The apparatus of claim 51 wherein the means for modifying and replacing comprises means for generating a cursor identification signal and replacing a smoothing factor in the memory with the corresponding cursor identification signal, and wherein the multiplexer comprises means for replacing a video signal detail element with a cursor signal in response to the cursor identification signal.

53. The apparatus of claim 51 wherein the means for modifying and replacing comprises:
a processor for changing the amplitude of a smoothing factor; and
an address bus for reading a stored smoothing factor from the memory and writing a modified smoothing factor into the memory.

54. The apparatus of claim 53 comprising a keyboard for allowing a user to instruct the processor to modify selected smoothing factors.

55. The apparatus of claim 53 comprising a monitor for displaying a representation of the smoothing factors.

* * * * *